United States Patent [19]

Williams

[11] 4,364,610
[45] Dec. 21, 1982

[54] RAILWAY VEHICLE BRAKING SYSTEMS

[75] Inventor: Eric F. Williams, Chippenham, England

[73] Assignee: Westinghouse Brake and Signal Company, Limited, England

[21] Appl. No.: 134,764

[22] Filed: Mar. 28, 1980

[30] Foreign Application Priority Data

Mar. 28, 1979 [GB] United Kingdom ................. 7911002

[51] Int. Cl.³ ............................................. B60T 15/36
[52] U.S. Cl. ........................................ 303/36; 188/83; 188/198; 303/20
[58] Field of Search ............... 188/83, 85, 196 R, 198; 303/1, 3, 9, 15-17, 20, 27-30, 36, 61

[56] References Cited

U.S. PATENT DOCUMENTS 3,517,784  6/1970  Clemmons ..................... 188/196 A
3,890,013  6/1975  Coiner ................................ 303/20
3,970,348  7/1976  Maskery ............................ 303/3 X Primary Examiner—Duane A. Reger
Attorney, Agent, or Firm—Larson and Taylor

[57] ABSTRACT

A railway vehicle braking system is provided with snow-brake control means operable in freezing temperatures for overriding the normal full brake release condition in a vehicle coasting or traction situation to apply a small brake force for prolonged periods to engage blocks or shoes on the vehicle wheels to reduce icing. The snow brake control means itself includes an override arrangement for, from time-to-time, effecting complete but temporary release of such a snow brake application so as to enable whatever slack adjustment is necessary to thereby insure continued validity of the brakes for a service application despite brake wear resulting from prolonged snow brake application.

8 Claims, 2 Drawing Figures

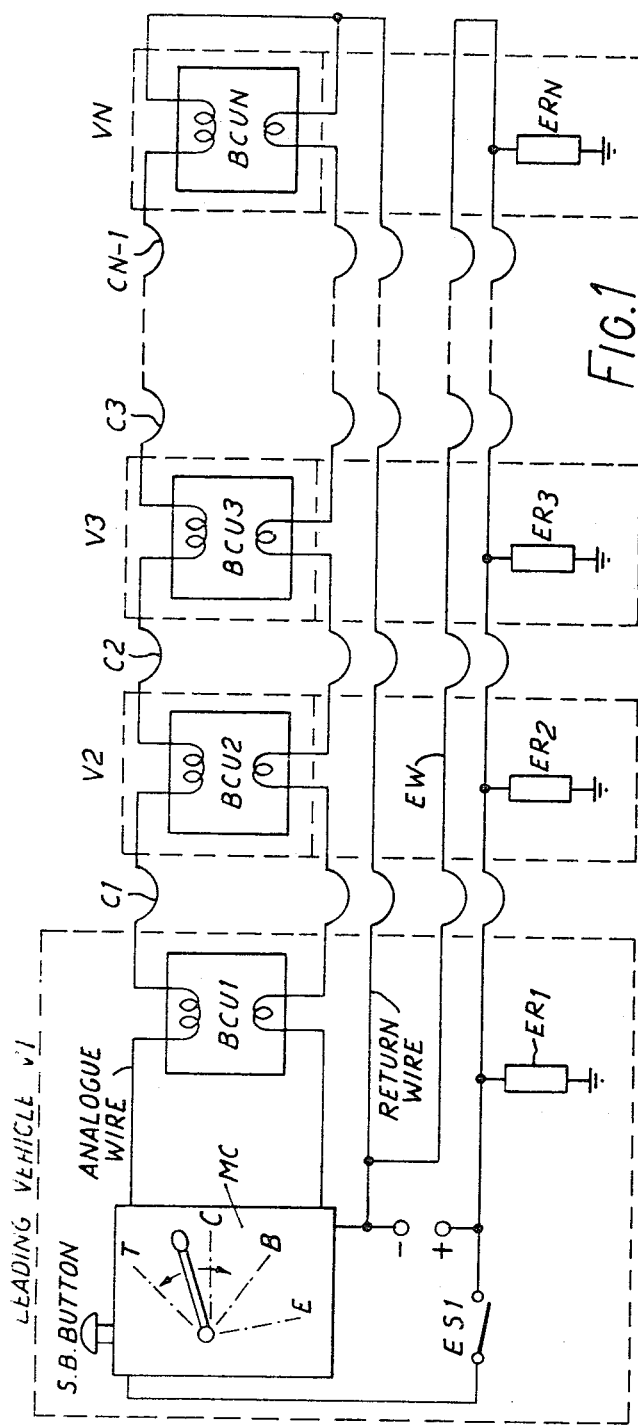
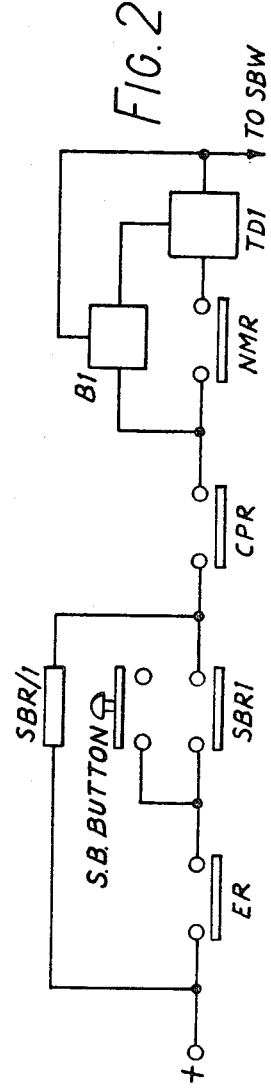
FIG.1
FIG.2

RAILWAY VEHICLE BRAKING SYSTEMS

This invention relates to railway vehicle braking systems and relates in particular to such systems which include a facility for maintaining a rubbing brake application under adverse winter conditions.

It has been previous practice in railway vehicle braking systems designed for low temperature operations to provide means for maintaining a virtually continuous light rubbing brake application between the shoes of tread brakes and braked wheels of a vehicle during adverse conditions of snow or ice. The friction and heat generated by such action, while not producing an appreciable retarding effect on the train, is sufficient to reduce build-up of ice on the wheel treads and therefore to ensure more predictable service or emergency braking performance.

One shortcoming of such a facility is that once actuated, such a brake operation may result in wear on the tread brake shoes which is so excessive as to eventually prevent a subsequent full and proper brake operation being made.

According to the present invention, there is provided a railway vehicle braking system including snow brake control means for maintaining a light brake application during normal traction or coasting in order to reduce icing of wheels of a vehicle and including override means operable from time-to-time without conscious action by a driver to override said snow brake means to permit complete, but temporary, brake release. The duration of this automatic, intermittent full release of the brakes is such as to afford the automatic slack adjusters provided in the system sufficient opportunity to make whatever adjustment is necessary to accommodate any detected excess of slack.

Thus, by virtue of the override means, the automatic slack adjusters provided in the system are operated sufficiently frequently, and in a manner consistent with their proper operation, so as to ensure that tread brake shoe wear does not attain amounts which would prevent efficient service or emergency brake applications.

In order that the invention may be more clearly understood the invention will be further described by way of example with reference to the accompanying drawings of which:

FIG. 1 illustrates, in block schematic form, relevant parts of a railway vehicle braking system in accordance with the invention, and FIG. 2 illustrates part of snow brake control means for the system of FIG. 1.

The railway vehicle braking apparatus envisaged is assumed to consist of electro-pneumatic braking apparatus on each car of a train, the apparatus being controlled by a driver's master controller (DMC) at one end of the train by means of control wires extending the full length of the train through inter-car couplers. The control of the braking of the train is assumed to be effected by virtue of a d.c. analog signal carried by a so-called p-wire. Typically, a current of 1 amp. in the p-wire represents full traction, a current of ½ amp. represents a coasting command and a current of zero amps. represents full braking. Graduable amounts of traction for braking are provided between the coasting and full traction or the coasting and full braking values of the p-wire current. The analog current at each car is converted by a suitable decoding arrangement into a pneumatic pressure which is supplied from a local reservoir on each car to effect braking through a conventional brake cylinder with slack adjuster and the necessary interconnecting rigging to tread brake units. Additionally, the train is to be provided with means which, when energised, provide a "snow brake" control to the brakes on each of the vehicles. Typically, the snow brake may be such as to maintain a virtually continuous braking pressure of 5 to 10 p.s.i. in the brake cylinders to ensure continuous rubbing contact between the tread brakes and the wheels and thereby reduce icing of the wheels under winter conditions.

Referring to FIG. 1 of the drawings, this shows in block form relevant parts of an electro-pneumatic braking system for a train of vehicles, the vehicles being denoted by references V1, V2, V3 etc. to VM. Leading vehicle V1 in the present example is a control vehicle and houses, inter alia, traction motors and a driver's position with a driver's master controller MC provided, inter alia, with a brake and traction control handle having various positions denoted "T", "C", "B" and "E". The controller is also provided with a snow brake button. The controller operates to provide a d.c. current analog signal in an analog wire AW connected via inter-car couplers C1, C2, C3 etc. to electronic E.P. brake control units denoted by references BCU1, BCU2, BCU3 and BCUN on the respective vehicles, the control units being fed, via d.c. current transformers, from the analog wire for controlling the brakes and traction on the respective vehicles. A return wire RW passes back to the leading vehicle V1 from the vehicle BN to form a complete current loop and it will be seen that a further emergency wire loop formed by emergency wire EW is provided along the train.

The driver's master controller circuit is supplied via a contact ES1 of an emergency switch from the battery source of the traction vehicle V1.

As stated, an emergency loop circuit formed by emergency wire EM is also included and passes through the length of the train. Energization of this loop circuit maintains energization of emergency relays ER1, ER2, ER3 etc. of the control units of each of the following vehicles so that in the event of an emergency, such as a break-away, the relative supplies to these units are immediately interrupted and emergency braking ensues regardless of any other control signal which may be present. In the case of vehicle V1, contacts of relay ER1, not shown, are included in the battery supply to the controller.

The apparatus also includes a snow brake signal which can be injected into the respective electronic brake control units BC1, BC2 etc. to call for predetermined light brake applications under coasting or traction conditions.

Referring to the operation of the arrangement of FIG. 1, the driver controls the vehicle by operation of the control handle moving same in the direction of the position "T" for the purposes of driving the traction motors and in order to allow the train to coast, the handle is moved to the position "C". In order to effect increasing degrees of braking, the handle is moved from the position "C" towards the position "B" beyond which a position "E" provides the driver with means for initiating emergency braking by opening emergency switch ES1 to interrupt the current supply to the controller circuit and therefore to the analog wire. The supply to the analog wire is produced by virtue of suitable potentiometer means (not shown) in the controller to control a constant current source variable from zero amps to 1 amp through a coasting position of 0.5 amps as discussed above. In response to these currents or intermediate values within the range, the control units BCU1 to BCUN respond to control the electropneumatic brakes to determine the retardation of the respective cars. Although not discussed, it will be understood moreover that appropriate load-weighing facilities may be provided on the respective cars to modify the braking forces produced in accordance with the loads and therefore the inherent momentum of the respective vehicles. Furthermore, the vehicles are usually provided with passenger-operable means for effecting emergency braking by interrupting the emergency wire circuit EW and thereby achieving drop-out of the ER relays and interruption of the supply current to the controller, to produce emergency braking on all vehicles of the train. Similar effects are produced in the event of the train breaking in two. Operation of the snow brake button on the driver's brake unit in the coast "C" or any position between "C" and the traction position "T", has the effect of overriding the control of the brake control units by the analog wire and supplies a braking control current via the snow brake wire to the train of the order of 0.4 amps to which the brake control units respond to effect a rubbing brake application to reduce the effects of icing on the wheels.

Referring to FIG. 2, the snow brake circuit operable by the SB button of FIG. 1 is shown involving, inter alia, contacts of normally existant relays in a railway vehicle control system.

A positive battery supply terminal P is connected via the contacts of emergency relay ER, (which are normally energized) to a "snow-brake" relay contact SBR1 which provides a path for holding a snow brake circuit self energized when the SB button (FIG. 1) is actuated by the driver. Also in series there are provided a coast presence relay contact CPR and a no-motion relay contact NMR. The coast presence relay is a relay, the contacts of which are maintained closed in both the coasting position "C" and the traction positions "T" of the driver's handle.

The output derived via the series arrangement of these contacts is applied via a time delay device TD1 via snow brake wire SBW to the brake control units on the respective cars to apply a predetermined rubbing contact force between tread brake units and wheels even when the driver's handle is at "C" or between "C" and "T" positions. In the event of the handle being placed in the braking position, the control of the brakes is re-established to the control handle despite the snow brake circuit continuing to be energized via the contact SBR. However, since the coil of the snow brake relay is energized via the emergency relay ER which is maintained closed during normal running, drop-out of this relay de-energizes the snow brake relay SBR and it is necessary for the driver to reset the snow brake on taking over control again of the train.

The arrangement considered above is appropriate for rapid transit vehicles which are subjected to frequent station stops and provide for release of the brakes following a station stop, since the no-motion relay NMR will be de-energized at each such stop, and thus there will be a brief interval during which the brakes are fully released for a minimum time when the train is about to move away as, determined by the timing device TD1. Device TD1 is set upon energization of the coast presence relay by operation of a bistable circuit B1 via contact CPR of the coast presence relay. Thereafter TD1 produces an output which re-applies the snow brake and resets the bistable circuit. This ensures that the slack adjusters in the brake mechanisms are enabled to take-up such slack as may exist resulting from brake shoe wear and thereby ensure that the brakes are maintained in proper adjustment despite the virtual continuous use of the snow brake.

Whilst, in the foregoing, the arrangement, as described, relies upon the train coming to rest to ensure full release of the brakes when the snow braking circuit is energized, it is clearly possible to adapt the invention to an alternative arrangement wherein a timer, is provided which times-out pre-determined time intervals of, conveniently, approximately thirty minutes to initiate a release of the snow brake to ensure full release of the brakes and a resultant slack adjustment as necessary during normal running.

Alternatively, means may be provided such as a pulse counter for counting pulses from a tacho-generator or the like provided on the train for detecting the attainment of predetermined units of distance covered. On attainment of units of distance of, say, ten miles, the snow brake could thereby be de-energized during normal running to again ensure that proper slack adjustment is effected.

In any event, it is important that the intervals, more especially of distance covered by the train, are sufficiently short between releases of the snow brake to ensure that where the slack adjusters are of an incremental variety rather than a gulper variety, there is no possibility of accumulative build-up of wear over a period of operation, despite prescribed releases and automatic adjustments thereby being effected.

Having thus described our invention what we claim is:

1. In a railway vehicle braking system including an automatic slack adjuster for detecting excess slack in the brakes and for adjusting the brakes in accordance therewith and "snow brake" control means for, during operation of the "snow brake" control means, normally maintaining a light brake application when the vehicle is under traction or is coasting, the improvement wherein said "snow brake" control means includes brake interruption means operating automatically and intermittently to fully release the brakes and brake reapplication means for operating automatically to reapply the brakes after the brakes have been released by the brake interruption means at a time after the brakes have been released sufficient to permit the slack adjuster to make any adjustment necessary to accommodate any detected excess of slack.

2. A railway vehicle braking system as claimed in claim 1 wherein said snow brake control means includes an electrical circuit comprising means operable in response to a traction control member being in a traction or coasting condition.

3. A railway vehicle braking system as claimed in claim 2 wherein the braking system is controllable by an electrical analog signal and said "snow brake" means includes circuit means responsive to a predetermined analog signal.

4. A railway vehicle braking system as claimed in claim 1 wherein said "snow brake" control means includes a self-holding relay which provides self-holding dependent upon an emergency relay contact not being broken.

5. A railway vehicle braking system as claimed in claim 1 wherein said brake interruption means includes means operable to effect a full temporary release following the vehicle coming to rest.

6. A railway vehicle braking system as claimed in claim 1 wherein said brake interruption means includes means operable to effect a full temporary release of the brakes upon expiration of predetermined time intervals.

7. A railway vehicle braking system as claimed in claim 1 wherein said brake interruption means includes means operable to effect a full temporary release of the brake when the vehicle travels predetermined distance intervals.

8. A railway vehicle braking system as claimed in claim 1 wherein said slack adjuster is of the incremental type.

* * * * *